United States Patent [19]

Yeager

[11] E Re. 29,409

[45] Reissued Sept. 20, 1977

[54] PHENOXARSINE COMPOUNDS INCORPORATED INTO RESINS WITH PHENOLS

[75] Inventor: Charles C. Yeager, Andover, Mass.

[73] Assignee: Ventron Corporation, Beverly, Mass.

[21] Appl. No.: 668,951

[22] Filed: Mar. 22, 1976

Related U.S. Patent Documents

Reissue of:

[64] Patent No.: 3,288,674
Issued: Nov. 29, 1966
Appl. No.: 440,013
Filed: Mar. 15, 1965

[51] Int. Cl.[2] ..... A61K 31/10; A61K 31/74; A61K 31/285

[52] U.S. Cl. ..... 424/78

[58] Field of Search ..... 424/78, 297, 337

[56] References Cited

U.S. PATENT DOCUMENTS

| | | | |
|---|---|---|---|
| 2,492,419 | 12/1949 | Gayler | 260/33.4 |
| 2,959,517 | 11/1960 | Bowers | 424/337 |
| 3,069,252 | 12/1962 | Josephs | 71/2.5 |
| 3,105,060 | 9/1963 | Schramm | 167/42 |
| 3,228,830 | 1/1966 | McFadden | 424/297 |
| 3,288,674 | 11/1966 | Yeager | 424/297 |

*Primary Examiner*—Stanley J. Friedman
*Attorney, Agent, or Firm*—Dressler, Goldsmith, Clement, Gordon & Shore, Ltd.

[57] ABSTRACT

*Microbicidal properties are imparted to vinyl resins by the incorporation therein of a selected phenoxarsine compound dissolved in a solvent which may be one of a selected group of phenols and monocarboxylic acids.*

10 Claims, No Drawings

PHENOXARSINE COMPOUNDS INCORPORATED INTO RESINS WITH PHENOLS

Matter enclosed in heavy brackets [ ] appears in the original patent but forms no part of this reissue specification; matter printed in italics indicates the additions made by reissue.

This invention relates to vinyl resins having bactericidal properties. More particularly, it relates to polyvinyl esters which display marked anti-bacterial and anti-fungal characteristics. Still more particularly, it relates to molded vinyl resins and to plasticizers therefor and to a novel method of incorporating phenoxarsine compounds as a component of the plasticizers.

In accordance with the invention, a solution of a phenoxarsine is prepared, the solution is introduced into a compatible plasticizer and the plasticizer composition incorporated into vinyl resins which will be subjected to mechanical manipulation, i.e., to pressing, swaging, molding, etc., to produce molded objects, flexible sheeting and film, coating compositions, and the like.

In general, resinous materials such as polymers and copolymers of polyvinyl esters are inert to microbial and fungal attack. Nevertheless, they readily act as carriers for microorganisms and the surface of resinous articles may become contaminated with materials which function as nutrients for the microorganisms so that the growth of the latter can occur on such surfaces. In addition to being a continuous source of contamination, the articles themselves are often subject to deterioration due to bacterial and fungal attack on the plasticizers incorporated into the resins to impart certain desirable physical properties and to facilitate molding operations.

It has been common practice, in order to protect resins from bacterial and fungal deterioration to incorporate agents for the purpose of rendering the resinous products bacteriostatic. Most of these agents have suffered from the disadvantage that their solubility in the resins or in the plasticizers were limited, or they were relatively fugitive, as a consequence of which their effectiveness was of limited duration. A further disadvantage has been that the known agents must be used in relatively large concentrations, as for example, 2% to 4% of the resin. This is ordinarily objectionable both from the viewpoint of cost and because the excessive amount of bacteriostat may adversely affect the color or the physical properties of the resin. The method of incorporating the agents capable of imparting bactericidal and fungicidal properties, used hereto, has been to mill in, for example, powdered fungicidal agent or to mix in the resin being compounded, a solution of the agent in such compatible fugitive solvents as toluene, benzene, and the like.

Now, it has been discovered that phenoxarsine compounds which are insoluble in the fugitive solvents commonly available in the plastic industry, for example, glycols such as propylene glycol, ethers such as ethylene glycol monobutyl ether, ketones such as ethyl methyl ketone, diisobutyl ketone, etc., and the like and also insoluble in plasticizers such as, dioctyl phosphate, tricresyl phosphate, epoxidized tallate, butyl phthalyl butyl glycolate, ethyl salicylate, and the like, can be incorporated in effective small amounts in a unique solution form compatible with the plasticizers to provide the compositions with excellent anti-bacterial and anti-fungal properties. The phenoxarsine compounds when incorporated by this phenol solvent solution method display an effective microbicidal and fungicidal action rather than a mere inhibition of the growth of such bacteria.

As above indicated, relatively small amounts of the phenoxarsine component, i.e., amounts of the order of 100 to 500 parts per million, present in the resinous compositions in a solution form are effective to produce the desired effect.

The phenoxarsine compounds to be employed in accordance with the present invention have the following general formula:

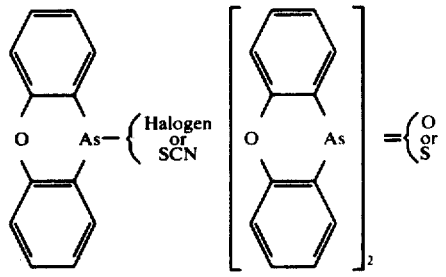

Derivatives of the phenoxarsines useful in the instant invention are, for example, the halogen derivatives such as 10-chlorophenoxarsine, 10-iodo-phenoxarsine, 10-bromo-phenoxarsine, 4-methyl-10-chlorophenoxarsine, 2-tertiary butyl-10-chlorophenoxarsine, 1,4-dimethyl-10-chlorophenoxarsine, 2-methyl-8,10-dichloro phenoxarsine, 1,3,10-trichloro phenoxarsine, 2,6,10-trichloro phenoxarsine, 2,8,10-trichloro phenoxarsine, 1,2,4,10-tetrachloro phenoxarsine, the oxygen derivatives such as the 10,10'-oxybis phenoxarsine, the thio derivatives such as 10-thiocyanato phenoxarsine, 10,10'-thio bis phenoxarsine, also may be used.

These phenoxarsine compounds are prepared for incorporation into a plasticizer and subsequent incorporation into the resins by dissolving in hydroxy-bearing solvents in which the compounds are soluble to the extent of at least 5%. Generally, the phenoxarsines have a higher solubility in compounds such as phenols and the combination of phenoxarsine and the phenols are preferred because quantities of phenoxarsines of the order of 300 to 500 parts per million are obtainable with less quantities of the solvent phenols which phenols cannot be tolerated in, for example, vinyl resins in too great a proportion.

Materials useful as a solvent for the phenoxarsine compounds are those having a labile hydroxyl group. Useful compounds are mono and di-hydroxy compounds, for example, phenol, phenol derivatives, for example, the alkyl phenols, such as cresols, e.g., methyl phenol, 2-methyl-5-isopropyl phenol, 3-methyl-6-isopropyl phenol, and the like. Chlorinated phenols such as 4-chloro-2-phenylphenol, and 6-chloro-2-phenylphenol. Amino phenols such as p-aminophenol and m-aminophenol. Dihydric phenols such as catechol, resorcinol, 3,5, dihydric toluene, and the like, aliphatic alcohols having 5 to 12 carbon atoms such as lauric, 2-ethyl hexanol, octenol, 1,2,6-hexantriol, 2-methoxy methyl-2,4, dimethyl pentane diol, and the like, and monocarbocyclic acid having 5 to 12 carbon atoms such as caproic acid, 2-ethyl hexoic acid, isotoic acid, and the like. The solvent carrier compatible with the plasticizers which is preferred, is a non-toxic alkyl phenol, such as nonyl phenol, dodecyl phenol, di-sec amyl phenol, and the like.

The solution of phenoxarsine in a solvent containing a labile hydroxyl group is incorporated into a plasticizer for the resin to be mechanically worked. Typical plasticizers are tricresyl phosphate, dipropylene glycol, dibenzoate, diphenylcresyl phosphate, epoxidized soya, epoxidized tallate, dioctyl azelate, alkyl aryl phosphates, diisobutyl phthalate, hydrogenated methyl rosin ester, and the like.

The solvent solutions of phenoxarsine which are preferred, are those which hold in stable solution between about 10% and about 25% by weight of arsenical although amounts of arsenical as low as 5% may be used. Such a solution can be dissolved and/or dispersed in the plasticizer in amounts constituting between about 2% and about 10% by weight of the total mixture, with amounts in the range between about 4% and about 6% preferred. The plasticizer compositions thus contain between about 0.2% and 2.5% of phenoxarsine compound, between about 1.8% and 7.5% of solvent and between about 90% to 98% of plasticizer.

When phenoxarsines are present in a plasticizer in the quantity set forth, the phenoxarsine content of a processed resin, for example, vinyl resin, will be in the range between about 0.02% and about 0.1%, i.e., amounts in the range between about 200 and 1000 parts per million.

In order to more fully illustrate the invention, the following examples are included. These examples are intended to be illustrative and are given without any intention that the invention be limited thereto.

[Example I

A solution indicated solution A was prepared by mixing 20 parts by weight of 10-chlorophenoxarsine into 80 parts by weight of nonyl phenol. The mixture was heated to approximately 230° F. to attain a temperature sufficient to melt the 10-chlorophenoxarsene. After agitation until a uniform solution was attained, the solution was cooled to a room temperature.

100 parts of the phenol solution was then mixed with 1900 parts by weight of expoxidized soya.

A plastisol was prepared from the phenol solution containing epoxidized soya which has the following formulation: 1000 parts polyvinyl chloride resin (Geon 121), 435 parts of dioctyl azelate plasticizer, 50 parts of solution A and 15 parts barium-cadmium-zinc soap. The liquid ingredients were mixed and then the solid resin added slowly with agitation. After thorough admixture, the resin was molded to a film of approximately 100 mils thickness and heated for 10 minutes at 350° F. to effect a cure.

The vinyl film was cut into test rectangles, placed on a glass panel so that there was one for each five minutes of test period. The glass panels with the samples were placed in an oven which was maintained at a temperature of 375° F. At each five minute interval, one piece of film was removed up to a total of 60 minutes. The vinyl test rectangles showed that the yellowing of the film containing the phenol solution (solution A) was equal to or less than control films containing no phenol solution.

Test panels were also cut from the vinyl film and subjected to the following test to establish fungicidal activity.

Test panels were placed on nutrient agar surfaces in pertri dishes, each agar surface having been previously inoculated with a selected microorganism. The petri dishes were covered and incubated for a period of 14 days for fungi at a temperature of 30° C., and for 34 hours at a temperature of 37° C., for bacteria. At the end of this period, the clear zone indicating inhibition of growth extending outwardly from the test panels was measured. The results are given below in Table I.

Table I

| | Organism | Zone of inhibition (mm.) |
|---|---|---|
| Panel containing 5% phenol solution (500 p.p.m. arsine compound) | A. niger | 15 |
| | S. aureus | 12 |
| Control panel containing no micro-biocide | A. niger | 0 |
| | S. aureus | 0 ] |

EXAMPLE [II]

A solution indicated solution B was prepared by mixing 20 parts by weight of 10,10'-oxybis phenoxarsine into 80 parts by weight of di-secondary amyl phenol. The mixture was heated to approximately 230° F. to attain a temperature sufficient to melt the 10,10'-oxybis phenoxarsine. After agitation until a uniform solution was attained, the solution was cooled to room temperature.

100 parts of the phenol solution was then mixed with 1900 parts by weight of epoxidized soya.

A plastisol was prepared from the phenol solution having the following formulation, 1000 parts polyvinyl chloride resin (Geon 121), 435 parts of dioctyl azelate plasticizer, 50 parts of solution B and 15 parts barium-cadmium-zinc soap. The liquid ingredients were mixed and then the solid resin added slowly with agitation. After thorough admixture, the resin was molded to a film of approximately 100 mil thickness and heated for 10 minutes at 350° F. to effect a cure.

The vinyl film was cut into test rectangles, placed on a glass panel so that there was one for each five minutes of test period. The glass panels with the samples were placed in an oven which was maintained at a temperature of 375° F. At each five minute interval, one piece of film was removed up to a total of 60 minutes. The vinyl test rectangles showed that the yellowing of the film containing the phenol solution (solution A) was equal to or less than control films containing no phenol solution.

[ Test panels were also cut from the vinyl film and subjected to the test to establish fugicidal activity as described in Example I.]

*Test panels were also cut from the vinyl film and subjected to the following test to establish fungicidal activity.*

*Test panels were placed on nutrient agar surfaces in petri dishes, each agar surface having been previously inoculated with a selected microorganism. The petri dishes were covered and incubated for a period of 14 days for fungi at a temperature of 30° C., and for 34 hours at a temperature of 37° C., for bacteria. At the end of this period, the clear zone indicating inhibition of growth extending outwardly from the test panels was measured. The results are given below in the Table.*

TABLE [II]

| | Organism | Zone of Inhibition (mm.) |
|---|---|---|
| Panel containing 5% phenol solution (500 p.p.m. arsine compound). | A. niger | 15 |
| | S. aureus | 12 |
| Control panel containing no micro-biocide | A. niger | 0 |
| | S. aureus | 0 |

The foregoing description is given for clearness and understanding only and no unnecessary limitations should be understood therefor, for modifications will be obvious to those skilled in the art.

I claim:

[1. A method of incorporating microbicidal amounts of phenoxarsine compounds into vinyl resin material which comprises dissolving a phenoxarsine compound selected from the group consisting of 10-halophenoxasines, alkyl substituted 10-halophenoxarsines, halogen substituted 10-halophenoxarsines and derivatives of phenoxarsines wherein said derivatives are selected from the group consisting of 10,10'-oxybis phenoxarsine, 10-thiocyanato phenoxarsine and 10,10'-thiobis phenoxarsine, in a solvent selected from the group consisting of phenol, alkyl phenols, chlorinated phenols, amino phenols, dihydric phenols, aliphatic alcohols having 5 to 12 carbon atoms and monocarbocyclic acids having 5 to 12 carbon atoms, admixing said solvent solution with said vinyl resin material and processing said admixture to desired solid physical form.]

2. A method according to claim [1] *11* wherein the phenoxarsine compound is 10-chlorophenoxarsine.

3. A method according to claim [1] *11* wherein the solvent is nonyl phenol.

4. A composition of matter useful for plasticizing vinyl resins and imparting microbicidal properties thereto which comprises a liquid plasticizer for vinyl resins and a microbicidal amount of a phenoxarsine compound selected from the group consisting of 10-halophenoxarsines, alkyl substituted 10-halophenoxarsines, halogen substituted *10-halophenoxarsines* and derivatives of phenoxarsines wherein said derivatives are selected from the group consisting of 10,10'-oxybis phenoxarsine, 10-thiocyanato phenoxarsine and 10,10'-thiobis phenoxarsine, said phenoxarsine compound being present in the plasticizer in the form of solute in a solvent selected from the group consisting of phenol, alkyl phenols, chlorinated phenols, amino phenols, dihydric phenols, aliphatic alcohols having 5 to 12 carbon atoms and monocarbocyclic acids having 5 to 12 carbon atoms, said solvent and solute being uniformly distributed in said plasticizer to form a single phase system.

5. A composition according to claim 4 wherein the phenoxarsine compound is present in the form of the solute in a nonyl phenol solution.

6. A composition according to claim 4 wherein the phenoxarsine is present in the form of the solute in a mixture of disecondary amyl phenol and nonyl phenol.

7. A composition of matter comprising a uniform admixture of vinyl resin and a vinyl resin plasticizer containing a microbicidal amount of a phenoxarsine compound selected from the group consisting of 10-halophenoxarsines, alkyl substituted 10-halophenoxarsines, halogen substituted *10-halophenoxarsines* and derivatives of phenoxarsines wherein said derivatives are selected from the group consisting of 10,10'-oxybis phenoxarsine, 10-thiocyanato phenoxarsine and 10,10'thiobis phenoxarsine present in said plasticizer as the solute in a solvent selected from the group consisting of phenol, alkyl phenols, chorinated phenols, amino phenols, dihydric phenols, aliphatic alcohols having 5 to 12 carbon atoms and monocarbocyclic acids having 5 to 12 carbon atoms, said solvent and solute being uniformly distributed in said plasticizer to form a single phase system.

8. A composition of matter comprising a uniform mixture of approximately 1000 parts by weight of liquid polyvinyl chloride resin, 435 parts by weight of dioctyl azelate, 0.5 parts by weight of 10,10'-oxybis phenoxarsine, 2 parts by weight of nonyl phenol, 47.5 parts of epoxidized soya, 15 parts by weight of barium-cadmium-zinc soap, said 10,10'-oxybis phenoxarsine being present as a solute in the nonyl phenol solution which is uniformly distributed in said epoxidized soya forming a single phase system.

9. A method according to claim [1] *11* in which the solvent solution of phenoxarsine is distributed uniformly in a plasticizer for vinyl resins to form a single phase system prior to admixing with vinyl resin material.

10. The method according to claim 9 in which the resultant solution produced by the uniform distribution of a phenoxarsine compound in a plasticizer for vinyl resins, is mixed with soap and liquid vinyl resin to form a plastisol and the plastisol then processed to desired physical form.

*11. A method of incorporating microbicidal amounts of phenoxarsine compounds into vinyl resin material which comprises dissolving a phenoxarsine compound selected from the group consistng of 10-halophenoxarsines, alkyl substituted 10-halophenoxarsines, halogen substituted 10-halophenoxarsines and derivatives of phenoxarsines wherein said derivatives of selected from the group consisting of 10,10'-oxybis phenoxarsine, 10-thiocycanato phenoxarsine and 10,10'-thiobis phenoxarsine, in a solvent selected from the group consisting of phenol, alkyl phenols, chlorinated phenols, amino phenols, dihydric phenols, aliphatic alcohols having 5 to 12 carbon atoms and monocarbocyclic acids having 5 to 12 carbon atoms, admixing said solvent solution with said vinyl resin material in an amount to provide a microbicidal amount of said phenoxarsine compound in said vinyl resin material and processing said admixture to desired solid physical form.*

* * * * *